United States Patent [19]

Tomes

[11] Patent Number: 4,981,705
[45] Date of Patent: Jan. 1, 1991

[54] BACTERIAL TREATMENT TO PRESERVE SILAGE

[75] Inventor: Nancy J. Tomes, Cummings, Iowa

[73] Assignee: Pioneer Hi-Bred International, Inc., Des Moines, Iowa

[21] Appl. No.: 431,883

[22] Filed: Nov. 6, 1989

[51] Int. Cl.$^5$ ............................................. A23K 3/02
[52] U.S. Cl. ...................................... 426/53; 426/54; 426/623; 426/636; 426/807
[58] Field of Search ................. 426/9, 52, 53, 54, 807, 426/623, 630, 636

[56] References Cited

U.S. PATENT DOCUMENTS

| | | | |
|---|---|---|---|
| 4,728,516 | 3/1988 | Bourdreaux et al. | 426/38 |
| 4,820,531 | 4/1989 | Tomes | 426/52 |
| 4,842,871 | 6/1989 | Hill | 426/44 |
| 4,863,747 | 9/1989 | Tomes | 426/61 |

FOREIGN PATENT DOCUMENTS

| | | |
|---|---|---|
| 1218894 | 3/1987 | Canada . |
| 0071858 | 2/1983 | European Pat. Off. . |

OTHER PUBLICATIONS

"Interactions of Lactobacillus and Propionibacterium in Mixed Culture", Parker, et al., *J. Food Protection*, vol. 45, No. 4, pp. 326–330 (1982).

"Aerobic Deterioration of Wheat, Lucerne and Maize Silages Prepared With *Lactobacillus acidophilus* and a Candida spp.," Moon, et al., *J. Appl. Bacteriology*, No. 49, pp. 75–87 (1980).

"Deterioration of High-Moisture Corn," McMahon, et al., *Applied Microbiology*, vol. 30, No. 1, pp. 103–109 (1975).

"Preservation of High Moisture Corn By Microbial Fermentation," Flores–Galarz, et al., *J. Food Protection*, vol. 48, No. 3, pp. 407–411, 1985.

"Preservation of Corn Silage by Means of Bacterial Inoculants of Propionic Acid," Khristov, et al., *Animal Science*, vol. 24, No. 8, Sofia 1987.

"Commensalistic Interaction Between *Lactobacillus acidophilus* and *Propionibacterium shermanii*," *Applied and Environ. Microbiology*, vol. 44, No. 1, Sep. 1982.

"Effect of Inoculation with Different Lactic Acid Bacterial Types on Corn Silage Fermentation," O'Leary, et al., *J Dairy Sci.*, Suppl. 68:125 (1985).

"The Significance of Propionibacterium Species and *Micrococcus lactilyticus* to the Ensiling Process," Woolford, *J. Appl. Bacteriol*, vol. 39, pp. 301–306.

"Inhibition of the Growth of Acid Tolerant Yeasts By Acetate, Lactate and Propionate and Their Syngergistic Mixtures," Moon, *J. Appl. Bacteriology* No. 55, pp. 453–460 (1983).

*Primary Examiner*—R. B. Penland
*Attorney, Agent, or Firm*—Zarley, McKee, Thomte, Voorhees & Sease

[57] ABSTRACT

Silage is preserved by treating it with a small but silage preserving effective amount of the microorganism *Propionibacterium jensenii* or the genetic equivalents thereof.

8 Claims, No Drawings

BACTERIAL TREATMENT TO PRESERVE SILAGE

BACKGROUND OF THE INVENTION

1. Field of the Invention

This invention relates to a method of preserving agricultural products which are used for animal feed after storage under anaerobic conditions.

2. Brief Description of Background Art

The use of silage additives has become a widely accepted practice throughout much of the agricultural world. In order to understand how silage additives react with silage, it may be helpful to first review the basic biochemical and microbiological changes that occur during the ensiling process. Immediately upon chopping of, for example, corn, aerobic respiration starts. During this early phase, soluble carbohydrates in the plant tissue are oxidized and converted to carbon dioxide and water. This process will continue until either the oxygen level is depleted or the water soluble carbohydrates are exhausted. Under ideal conditions, with adequate packing and sealing of the ensiled material, respiration lasts only a few hours. The growth of microorganisms during this period is limited to those that are tolerant to oxygen which includes aerobic bacteria, yeast and molds. These organisms are generally recognized as being negative to the system as they metabolize sugar to carbon dioxide, heat, and water.

Another important chemical change that occurs during this early phase is the breakdown of plant protein by plant proteases. Proteins are degraded to amino acids and further metabolized to ammonia and amines. It has been reported that up to 50% of the total proteins may be broken down during this process depending on the rate of pH decline in the silage.

Once anaerobic conditions are established, anaerobic bacteria proliferate. Enterobacteria and heterofermentative lactic acid bacteria are generally the first populations to become established. These organisms produce primarily acetic acid, ethanol, lactic acid, and carbon dioxide from the fermentation of glucose and fructose. Once the pH begins to decline, there is a marked increase in the homofermentative lactic acid bacteria population which produce primarily lactic acid. The rapid increase in lactic acid level results in the decline of the pH to around 4. At this point, the ensiled mass will generally remain stable throughout storage if undisturbed.

In summary, when the material is initially packed in an oxygen limiting structure such as a covered silo, the pH is reduced, the residual oxygen is utilized and the material is said to undergo a lactic acid fermentation. The material will remain stable and can be stored for many months in this condition.

When the silage is ready to be fed, the top cover is removed and the silo is opened for feeding. The material is then exposed to air and the process is no longer anaerobic. Microflora in the silage itself or airborne contaminants can begin to oxidize the acids present. This oxidation causes a loss in mass or dry matter of the feed and thus causes feeding losses. In addition, the resultant pH and temperature increases are objectionable to the animals and the feed will be refused by the animals after it has begun to heat. The incidence of aerobic instability observed in practice depends on the rate the ensiled material is removed from the silo and the length of time that the material has been ensiled before opening. If the silage is unloaded slowly then more time is allowed on the surface of the opened silage for deterioration to occur. Longer ensiling times produce generally more stable silage as the acid concentrations are higher and all microflora populations tend to decrease. In general the silage should be stable for at least five days after opening. This will allow for adequate time for the silage to be removed.

Recently it has become known that bacterial inoculants help preserve silage, including both grass silage and corn silage. For example, inoculation with lactic acid bacteria during the fermentation phase can be beneficial to the fermentation process, see for example U.S. Pat. No. 4,842,871 of Hill issued June 27, 1989, as well as the literature references cited therein. For high moisture corn stability, this increase is probably due to the inoculant enhancing the rate of anaerobic fermentation and pH decrease. This is beneficial because oxidative losses caused by aerobic pH sensitive microflora in the initial stages are thus avoided. In other silages such as whole corn plant, alfalfa, etc. the inoculant can also have beneficial effects on the digestibility of the silages by causes an increase in the availability of the fiber.

Currently there is not an inoculant available to effect stability in the second part of the process that occurs when the silo is opened to air. One reason for this lack of an effective inoculant is the antagonistic nature of anaerobic and aerobic preservatives. Each may interfere with performance of the other.

Accordingly, it is a primary objective of the present invention to develop a bacterial silage inoculant which is effective both during the initial anaerobic stages and also which will maintain effectiveness during the initial aerobic stages when a silo is opened to air.

Another objective of the present invention is to develop a silage inoculant which is effective in both stages, with the second stage inoculant also being an anaerobe and being one which does not in any way interfere with any initial anaerobic stage lactic acid producing bacteria inoculant which may be present.

Another objective of the present invention is to provide a silage inoculant which contains certain species of Propionibacteria which have been found to function effectively in the environment of lactic acid bacteria without either antagonizing the other. This results in effective silage preservative capability both during the initial anaerobic phase and because of the metabolic products of the Propionibacteria also during the subsequent aerobic phase.

The method and manner of accomplishing each of the objectives of the present invention as well as others will become apparent from the detailed description which follows hereinafter.

SUMMARY OF THE INVENTION

In the present invention silage, including grass and/or corn silage, are preserved both during the initial anaerobic phase of the ensilage process and as well during the initial phases of aerobic conditions after a silo is opened. Preservation is accomplished by mixing certain anaerobic phase bacterial inoculants which provide metabolic products which during the aerobic phase function to provide continued stability. The inoculant is Propionibacteria which importantly are compatible with the other anaerobic phase bacteria, and thus do not retard the ensilage process in any way. Added bacteria inoculant for the anaerobic phase preservation are typical Lactobacillus which generate lactic acid upon fermentation. The Propionibacteria are also anaerobes, but their metabolic products are responsible for aerobic phase stability. Preferably they are of the species *Propionibacterium jensenii* or the genetic equivalents thereof.

In summary, the present invention provides a method of treating silage which comprises administering to the silage a small but ensilage preserving effective amount of certain species of Propionibacteria, particularly *jensenii*, and most particularly strains P-9 and P-Fargo, having ATCC numbers 53961 and 53962, respectively, preferably in combination with lactic acid producing organisms.

DETAILED DESCRIPTION OF THE INVENTION

Spoilage of agricultural products such as hay, corn and the like, due to deterioration caused by the growth of spoilage organisms is a major problem in the agricultural community. For example, when corn is stored in a silo at high moisture, the resulting silage is remarkably poorer in nutritional value, and often higher in visible mold.

The term "silage" as used herein is intended to include all types of fermented agricultural products such as grass silage, alfalfa silage, corn silage, sorghum silage, fermented grains and grass mixtures, etc. All can be treated successfully with the inoculant of the present invention.

In accordance with the method of the present invention, silage is treated with a silage preserving effective amount of Lactobacillus organism, such as those in commonly owned U.S. Pat. No. 4,842,871 issued June 27, 1989. However, as earlier explained, to provide the maximum silage preserving effectiveness, one cannot ignore the aerobic conditions when a silo is opened, or when the silage is removed from the silo and placed in feed bunks. It is not uncommon for the earlier anaerobically stable product to rapidly undergo deterioration once exposure to air occurs.

Surprisingly, it has been discovered that if a silage inoculant comprises a portion of a conventional anaerobic bacterial inoculant such as a Lactobacillus organism, and another portion of certain anaerobic bacterial inoculant organisms whose metabolites function to preserve in aerobic conditions, then preservation will occur in both the aerobic and anaerobic phases, and neither is antagonistic to the performance of the other.

One surprising aspect of this invention is that only certain species Propionibacteria will function effectively in the present invention. The addition of Propionibacteria to silage as a general matter is known, see for example Flores-Galarza R.A. and B.A. Glatz, *J. Food Protection* 48:407–411 (1985). In addition, in the same journal there is an article by Parker, and this inventor, N.J. Moon, "Interactions of Lactobacillus and Propionibacterium In Mixed Culture," *J. Food Protection*, 45:326–330 (1982). This article differs from the present invention in that it uses different species of Propionibacteria, and the species of the 1982 article are not satisfactory for use in the present invention. If other species of Propionibacteria are used as opposed to those here named, there is no effect achieved in the aerobic state, and in fact the interaction of the combination may be worse, not better.

In sum, the present invention is necessarily species specific with regard to the Propionibacteria. In particular, the Propionibacteria species found to work in the present invention are: *Propionibacterium jensenii* and most preferably *Propionibacterium jensenii* strain P-Fargo and *Propionibacterium jensenii* strain P-9. It is to be understood, however, that applicant's invention, while species specific, is intended to cover these species and their genetic equivalents, or the effective mutants thereof which demonstrate the desired properties of the named species and strains. Such genetic equivalents or mutants thereof are considered to be functionally equivalent to the parent species. It is well known to those of ordinary skill in the art that spontaneous mutation is a common occurrence in microorganisms and that mutations can also be intentionally produced by a variety of known techniques. For example, mutants can be produced using chemical, radioactive, and recombinant techniques.

Regardless of the manner in which mutations or the genetic equivalents are induced, the critical issue is that they function to preserve the silage as describe for the parent species and/or strain. In other words, the present invention includes mutations resulting in such minor changes as, for example, minor taxonomical alterations.

Typical compositions useful for treatment of this invention may include the Lactobacillus organisms within the ranges useful for treating ensilage products, i.e. typically $10^8$–$10^{14}$ viable organisms/ton, preferably $10^{10}$–$10^{12}$ viable organisms/ton.

With regard to the *Propionibacterium jensenii*, and the particularly preferred strains P-9 and P-Fargo, the amount of viable organism per ton of silage should be within the range of about $10^8$–$10^{14}$ organisms per ton, preferably about $10^{10}$–$10^{12}$ organisms per ton. If desired, the Propionibacteria may be used alone, but it is preferred to use them in combination with lactic acid producing organisms.

The composition of the present invention can also include other common silage preservation organisms as, for example, Lactobacillus, Streptococcus, and Pediococcus, and certain enzymes from fungi or bacteria, providing they are in no way antagonistic to the active aerobic organisms.

Those of ordinary skill in the art will know of other suitable carriers and dosage forms, or will be able to ascertain such, using routine experimentation. Further, the administration off the various compositions can be carried out using standard techniques common to those of ordinary skill in the art, i.e. spraying, dusting, etc.

The above disclosure generally describes the present invention. A more detailed understanding can be obtained by reference to the following specific examples which are provided herein for purposes of illustration only and are not intended to be limiting, unless otherwise specified.

EXAMPLES

In the example runs shown in the Tables below, the treatment, preparation and storage was as follows. The Propionibacteria species used in the silage trials, which were conducted in the years 1986, 1987 and 1988 included both *Propionibacterium jensenii* species P-9 and P-Fargo, as well as other Propionibacteria for comparison. The *Propionibacterium jensenii* species are commonly available from a Culture Collection at Iowa State University, and are on deposit at the American Type Culture Collection (ATCC) as deposit numbers 53961 and 53962. In the tests, *P. shermanii*, designated P-19 and *P. thoenii*, designated as P-8, were used for comparisons to provide data showing that it is only *P. jensenii*, or its genetic equivalent, which is satisfactory in the present invention. The levels of inoculant was $10^5$ per gram. This corresponds to $10^{11}$ organisms per ton. Treatments were applied as a liquid.

The treated grain was divided into equal portions and packed into 5-gal plastic pails with tight fitting rubber gasketed lids. The lids were fitted with a pressure release valve so the gases could escape and still maintain anaerobiosis. The pails were stored at 20°–25° C. for 30 to 120 days prior to opening to simulate silo conditions.

The pails were opened scored for visual color differences, odor and then emptied onto a clean plastic sheet. Grain was mixed and samples taken for microbiological and chemical analysis. The remaining grain was divided into two 500 g portions and placed into styrofoam containers specially fabricated to have 2"walls to retain heat. Thermistors were placed in the center of the mass of each container and the temperature measured hourly for up to 7–10 days. Ph was determined twice daily using a spear point pH meter.

The populations of aerobes, microaerophiles, lactobacilli, streptococci, lactate utilizers, coliforms, and yeasts and molds, and actinomyces was determined using appropriate media and conditions. (e.g. TSA, MRS, MS, NAL, RBC, NBARC). Populations were determined in the grain at ensiling and when the silage was exposed to air on day 0 of the aerobic stability determinations.

Samples were assessed for their feed value when the ensiling process began and when the grain was opened for aerobic stability. The usual feed parameters including ADF, ADF N, NDF, N, ASH were determined. The fermentation acids were determined on the day of opening for aerobic stability.

In those cases where there was a combination with Lactobacillus bacteria, a commercial product of Pioneer Hi-Bred International, Inc., commonly available and known as Pioneer Brand 1186 was used. Pioneer Brand 1186 is a brand of high moisture corn inoculant that contains Lactobacillus plantarum as described in U.S. Pat. No. 4,842,871. This disclosure is incorporated herein by reference.

Tables 1, 2 and 3 below summarize the trials. "Control" had no inoculant, "1186" contained no Propionibacteria, P-8 is a different species than those of the invention, as is P-19. "PF" refers to P-Fargo. The data shows that generally more hours are required to have the pH increase to greater than 5.0 and for the temperature to increase 1.5° C. for opened silage which contains the Propionibacterium jensenii and that P-8 and P-19 do not work in the presence of 1186, and in fact may be antagonistic to proper performance of 1186 alone.

In the 1987 studies (Table 3) additional strains were used alone or in combination with 1186 and the silages were exposed to air after 60 days. In these studies the most aerobically stable silages were those again treated with the Propionibacterium sp. alone: P-9, P-Fargo, and P-8. These were temperature and pH stable for eight days, when the experiment was terminated. The least stable was the uninoculated control which showed an immediate pH instability and temperature rise. P-19 + 1186 showed immediate pH instability and temperature rise. P-19 + 1186, and 1186 were stable about one more day than the control. The other mixtures were intermediate in their stability for both pH and temperature.

Mixtures of each strain of the Propionibacteria and 1186 were less stable than any of the pure Propionibacteria strains and had lower levels of propionic acids. Thus in these studies an antagonistic response was observed with coinoculation of 1186 and certain of the Propionibacteria strains, but not P-9 and P-Fargo.

In 1988 the same design for the trials was used except additional times of opening were used to assess the progress of the fermentation and effect on stability and only two Propionibacteria strains were used P-8 and P-9. P-9 worked in combination with 1186 and P-8 did not.

Tables 1 and 2 are summaries of trials conducted in 1986–1988 on the effects of treatments on the stability of high moisture corn. Stability is defined as the hours required for the pH to increase to greater than 5.0 and the internal temperature to increase to 1.5° C. greater than ambient.

TABLE 1

| Year | Day of Opening | | Control | 1186 | P-9 | 1186 + P-9 | P8 | P8 + 1186 |
|---|---|---|---|---|---|---|---|---|
| 1986 | 34 | pH | 103 | 89 | | | | |
|  |  | temp | 65 | 83 | | | | |
| 1987 | 60 | pH | 79 | 120 | >168 | 144 | >168 | 138 |
|  |  | temp | 38 | 62 | >168 | 82 | 149 | 82 |
| 1988 | 35 | pH | 72 | 55 | 84 | 72 | 79 | 70 |
|  |  | temp | 50 | 43 | 60 | 55 | 50 | 55 |
|  | 95 | pH | 108 | 110 | 120 | 156 | 108 | 89 |
|  |  | temp | 68 | 76 | 72 | 82 | 60 | 48 |
|  | 140 | pH | >240 | 240 | 180 | 240 | >240 | >240 |
|  |  | temp | >240 | >240 | >240 | >240 | >240 | >240 |

TABLE 2

| Year | Day of Opening | | Control | 1186 | PF | PF + 1186 | P19 | P19 + 1186 |
|---|---|---|---|---|---|---|---|---|
| 1986 | 34 | pH | 103 | 89 | 120 | 79 | | |
|  |  | temp | 65 | 83 | 79 | 58 | | |
| 1987 | 60 | pH | 79 | 120 | >168 | >168 | >168 | 120 |
|  |  | temp | 38 | 62 | >168 | >168 | 132 | 67 |

Table 3 is a summary of trials conducted in 1986 through 1988. Shown are the hours of increased or decreased (−) stability compared to the control, which contains no inoculating organism.

TABLE 3

| Year | Day of Opening | | 1186 | P-9 | 1186 + P-9 | P8 | P-8 + 1186 |
|---|---|---|---|---|---|---|---|
| 1986 | 34 | pH | −14 | | | | |

TABLE 3-continued

| Year | Day of Opening | | Treatment | | | | |
|------|---------------|------|------|------|------------|-----|-----------|
|      |               |      | 1186 | P-9  | 1186 + P-9 | P8  | P-8 + 1186 |
| 1987 | 60            | temp | −2   |      |            |     |           |
|      |               | pH   | 41   | >89  | 65         | 89  | 59        |
|      |               | temp | 24   | >130 | 44         | 111 | 44        |
| 1988 | 35            | pH   | −17  | 12   | 0          | 7   | −2        |
|      |               | temp | −7   | 10   | 5          | 0   | 5         |
|      | 95            | pH   | 2    | 12.  | 48         | 0   | 5         |
|      |               | temp | 8    | 4    | 14         | −8  | −20       |
|      | 140*          | pH   | 0    | −60  | 0          | 0   | 0         |
|      |               | temp | 0    | 0    | 0          | 0   | 0         |
| Means for 30–95 days | | | | | | | |
|      |               | pH   | 2.5  | 37.7 | 37.7       | 24  | 9.5       |
|      |               | temp | 5.8  | 48.0 | 21.0       | 20  | 7.2       |

*pH and temperature stability for control exceeded 240 hours. All treatment were stable for more than 240 hours (10 days) for temperature and for 180 hours (7.5 days) for pH.

It is not known precisely why the combination of the specific mixed strains of Lactobacillus and *P. jensenii* of the present invention work, but it is believed to be due to the production of acetic and propionic acids in amounts sufficient to retard the development of yeasts and other spoilage microflora during the aerobic deterioration process. It is also believed that applicant has found certain species of *Propionibacterium jensenii* which are more tolerant of high lactic acid levels and a pH of 3.8–4.5 which is lower than the 5.0 environment, normally associated the Propionibacteria activity. In some cases, silages that were inoculated with these Propionibacteria also had lower yeast counts when the silages were open, suggesting that the yeasts were inhibited from growth during the ensiling process. These examples demonstrate that this effect is species specific, and that not all species or strains within the species work equally well. The *P. jensenii* species were the most efficacious, and P-9 and P-Fargo strains were best.

As illustrated, the inoculant may be the *P. jensenii* alone for its preserving effect in an aerobic environment, or it can be combined with an anaerobic preserving organism.

What is claimed is:

1. A method of preserving silage, said method comprising:
   treating silage with a small but silage preserving effective amount of *Propionibacterium jensenii* bacterium selected from the group consisting of P-9, ATCC No. 53961, and P-Fargo, ATCC No. 53962, or the genetic equivalent thereof.

2. The method of claim 1 wherein the amount of viable organism per ton of silage is within the range of $10^8$ to $10^{14}$ organisms per ton.

3. The method of claim 2 wherein the amount of viable organisms per ton of silage is within the range of $10^{10}$ to $10^{12}$ organisms per ton.

4. The method of claim 3 wherein the amount of viable organisms is about $10^{11}$ organisms per ton.

5. The method of claim 1 which includes treatment with a lactic acid producing organism.

6. The method of claim 1 which includes treatment with a Lactobacillus organism.

7. The method of claim 6 wherein the Lactobacillus organism is *Lactobacillus plantarum*, ATCC 53187, or the genetic equivalent thereof.

8. A silage preservative which comprises in combination:
   a small but silage preserving effective amount of the microorganisms *P. jensenii* selected from the strains of P-9, ATCC No. 53961, and P-Fargo, ATCC No. 53962, or the genetic equivalent thereof, in combination with a small but silage preserving effective amount of *Lactobacillus plantarum* ATCC 53187 organisms or the genetic equivalent thereof together with a suitable culture carrier.

* * * * *